United States Patent
Drillieres et al.

(10) Patent No.: US 9,765,212 B2
(45) Date of Patent: Sep. 19, 2017

(54) RUBBERY POLYMER WITH LOW COMPRESSION SET

(71) Applicant: OMNOVA SOLUTIONS, Courtaboeuf (FR)

(72) Inventors: Sophie Drillieres, Paris (FR); Eric Medard, Le Kremlin Bicetre (FR); Bernard Nigen, Meudon (FR)

(73) Assignee: OMNOVA SOLUTIONS (FR)

( * ) Notice: Subject to any disclaimer, the term of this patent is extended or adjusted under 35 U.S.C. 154(b) by 0 days.

(21) Appl. No.: 14/269,657

(22) Filed: May 5, 2014

(65) Prior Publication Data

US 2014/0243451 A1 Aug. 28, 2014

Related U.S. Application Data

(62) Division of application No. 12/679,964, filed as application No. PCT/EP2008/062978 on Sep. 26, 2008, now abandoned.

(60) Provisional application No. 60/995,368, filed on Sep. 26, 2007.

(30) Foreign Application Priority Data

Sep. 26, 2007 (EP) .................................. 07301398.9

(51) Int. Cl.
| | |
|---|---|
| *C08L 37/00* | (2006.01) |
| *C08F 220/18* | (2006.01) |
| *C08F 265/04* | (2006.01) |
| *C08L 27/06* | (2006.01) |
| *C08L 51/04* | (2006.01) |
| *C08L 33/08* | (2006.01) |
| *C08L 33/12* | (2006.01) |
| *C08L 33/20* | (2006.01) |
| *C08F 220/14* | (2006.01) |
| *C08F 220/40* | (2006.01) |
| *C08F 220/44* | (2006.01) |
| *C08F 222/18* | (2006.01) |
| *C08L 51/00* | (2006.01) |

(52) U.S. Cl.
CPC ............ *C08L 37/00* (2013.01); *C08F 220/18* (2013.01); *C08F 265/04* (2013.01); *C08L 27/06* (2013.01); *C08L 33/08* (2013.01); *C08L 33/12* (2013.01); *C08L 33/20* (2013.01); *C08L 51/003* (2013.01); *C08L 51/04* (2013.01); *C08F 220/14* (2013.01); *C08F 220/40* (2013.01); *C08F 220/44* (2013.01); *C08F 222/18* (2013.01); *C08L 51/00* (2013.01)

(58) Field of Classification Search
None
See application file for complete search history.

(56) References Cited

U.S. PATENT DOCUMENTS

| | | | | |
|---|---|---|---|---|
| 2,963,452 | A * | 12/1960 | Sinn et al. .................... | 524/24 |
| 5,362,787 | A | 11/1994 | Ngoc et al. | |
| 5,380,785 | A * | 1/1995 | Ngoc et al. .................. | 524/504 |
| 5,415,940 | A | 5/1995 | Ngoc et al. | |
| 5,552,468 | A | 9/1996 | Ngoc et al. | |
| 5,616,651 | A | 4/1997 | Ni no et al. | |
| 5,872,184 | A | 2/1999 | Mori et al. | |
| 5,889,113 | A | 3/1999 | Mori et al. | |
| 2005/0203247 | A1* | 9/2005 | Ahn et al. .................... | 524/804 |

FOREIGN PATENT DOCUMENTS

| | | |
|---|---|---|
| DE | 4414762 A1 | 11/1994 |
| GB | 2271115 A | 4/1994 |
| JP | 2002-277601 * | 9/2002 |
| JP | 2002277601 A | 9/2002 |

OTHER PUBLICATIONS

Computer Translation of JP 2002-277601 (2002).*
International Search Report and Written Opinion, PCT/EP2008/062978, dated Jan. 14, 2009.

* cited by examiner

*Primary Examiner* — Robert C Boyle
(74) *Attorney, Agent, or Firm* — Lerner, David, Littenberg, Krumholz & Mentlik, LLP

(57) ABSTRACT

A rubbery polymer comprising:
(a) butyl acrylate or a mixture of butyl acrylate and 2-ethylhexyl acrylate,
(b) at least one member selected from the group consisting of methyl methacrylate, ethyl methacrylate, methyl acrylate, and ethyl acrylate,
(c) acrylonitrile,
(d) styrene,
(e) a half ester maleate soap, and
(f) a crosslinking agent selected from allyl methacrylate, and mixtures of allyl methacrylate with glycidyl methacrylate, trimethylolpropanetrimethyl acrylate, dicyclopentenyloxyethyl methacrylate and divinylbenzene.

18 Claims, No Drawings

RUBBERY POLYMER WITH LOW COMPRESSION SET

CROSS-REFERENCE TO RELATED APPLICATIONS

The present application is a Divisional application of U.S. patent application Ser. No. 12/679,964, filed Jun. 30, 2010, which is a National Phase Application of International Application No. PCT/EP2008/062978, filed Sep. 26, 2008, which claims the benefit of U.S. Provisional Application No. 60/995,368, filed Sep. 26, 2007, the disclosures of which are incorporated herein by reference.

BACKGROUND OF THE INVENTION

The instant invention relates to rubbery polymers and their use in the preparation of compositions having low compression set useful for seals and gaskets.

Seals for automotive body applications (such as, windows, hoods, trunks and doors) and building applications (such as window glazing gaskets and weather strips) should be dimensional stable, provide low compression set, and offer outstanding sealing characteristics over a broad temperature range. Such seals must be capable of sealing out noise, wind and water, while providing long-term ultraviolet light resistance. At the same time the material used in the seal must offer the degree of flexibility required for the particular application. Window and door weather stripping for automobiles and trucks is a high volume application for such seals. However, seals offering essentially the same characteristics are also needed for sun roof seals, handle gaskets, window spacers, window guides, lock seals, windshield wiper pivot seals and in building applications such as window glazing gaskets and weather seals.

Rubbery blends of polyvinyl chloride (PVC) with a nitrile rubber (NBR) have sometimes been used in seals for automotive body applications. The nitrile rubber is included in such blends as a permanent modifier for the PVC which provides it with a higher degree of flexibility. However, the utilization of standard nitrile rubber in such blends typically results in only moderate compression set characteristics. It is very important for seals to have good compression set characteristics in most applications. For instance, improved resistance to water leaks and wind noise can be attained by utilizing a seal which has low compression set characteristics.

It is known from the teachings of GB Patent application 2 271 115 that low compression set characteristics can be improved by utilizing a technique known as "dynamic vulcanization" via free radical generators, such as azo compounds or organic peroxides. However, this "dynamic vulcanization" technique suffers from the weakness that the azo compounds or organic peroxides required reduce the thermal stability of the polyvinylchloride resin and the ultraviolet light resistance of the nitrile rubber. There is also an increased risk of early crosslinking during processing which leads to scorching and reduced recyclability.

U.S. Pat. No. 5,362,787 discloses a highly crosslinked nitrile rubber which can be easily blended with PVC to make compositions which have an excellent combination of properties for use in making seals and gaskets for automotive and building applications. The PVC blends made with such highly crosslinked nitrile rubbers offer excellent dispersion behavior, dimensional stability, low compression set, outstanding sealing characteristics, and low temperature flexibility.

U.S. Pat. No. 5,362,787 more specifically discloses a highly crosslinked nitrile rubber composition which can be blended with polyvinyl chloride to make compositions having excellent characteristics for seals and gaskets including dimensional stability, low compression set, outstanding sealing characteristics, and good low temperature flexibility, said highly crosslinked nitrile rubber composition being comprised of (1) a highly crosslinked nitrile rubber having repeat units which are derived from (a) 1,3-butadiene, (b) acrylonitrile, and (c) a crosslinking agent, wherein said highly crosslinked nitrile rubber has a Mooney viscosity of about 50 to about 120, a swelling index of less than about 10 percent, a mill shrinkage of less than 10 percent, and a gel content of greater than 90 percent; and (2) from about 1 to about 30 phr of a plasticizer.

U.S. Pat. Nos. 5,380,785 and 5,415,940 disclose a rubbery polymer which can be blended with polyvinyl chloride to make leathery compositions having good heat and ultraviolet light resistance, said rubbery polymer being comprised of repeat units which are comprised of (a) butyl acrylate, or optionally a mixture of butyl acrylate and 2-ethylhexyl acrylate containing up to about 40% 2-ethylhexyl acrylate, (b) at least one member selected from the group consisting of methyl methacrylate, ethyl methacrylate, methyl acrylate, and ethyl acrylate, (c) acrylonitrile, (d) styrene, (e) a half ester maleate soap, and (f) a crosslinking agent; the preferred crosslinking agents are ethylene glycol methacrylate, divinylbenzene and 1,4-butanediol dimethacrylate.

U.S. Pat. No. 5,552,468 discloses a highly crosslinked nitrile rubber composition which can be blended with polyvinyl chloride to make compositions having excellent characteristics for seals and gaskets including dimensional stability, low compression set, and outstanding sealing characteristics, said highly crosslinked nitrile rubber composition being comprised of (1) a highly crosslinked nitrile rubber having repeat units which are derived from (a) 1,3-butadiene, (b) acrylonitrile, and (c) a crosslinking agent, wherein said highly crosslinked nitrile rubber has a Mooney viscosity of about 50 to about 120, a swelling index of less than about 10 percent, a mill shrinkage of less than 10 percent, and a gel content of greater than 90 percent; and (2) from about 1 to about 30 phr (parts per hundred parts of rubber) of a plasticizer.

There is a great need for rubbery polymer to be blended with thermoplastic resins to attain low compression set while maintaining dimensional stability, low temperature flexibility, and outstanding sealing characteristics for light colored automotive and building gasket applications.

SUMMARY OF THE INVENTION

The present invention relates to a rubbery polymer which may be blended with thermoplastic resins to give polymeric compositions that can be employed in seals and gaskets for automotive and building application. These polymeric compositions have good tensile strength, tear resistance, ultra violet light resistance, and resistance to compression set.

The invention thus relates to a rubbery polymer which can be blended with a thermoplastic resin in order to confer to said thermoplastic resin a low compression set.

More precisely, the rubbery polymer, which can be blended with a thermoplastic resin, comprises:
(a) butyl acrylate or a mixture of butyl acrylate and 2-ethylhexyl acrylate,
(b) at least one member selected from the group consisting of methyl methacrylate, ethyl methacrylate, methyl acrylate, and ethyl acrylate, (c) acrylonitrile,
(d) styrene,
(e) a half ester maleate soap, and
(f) a crosslinking agent selected from allyl methacrylate, glycidyl methacrylate, trimethylolpropanetrimethyl acrylate, dicyclopentenyloxyethyl methacrylate, divinylbenzene, and mixtures thereof, wherein said rubbery polymer is obtainable by a process comprising the steps of:

(I) polymerizing monomers selected from (a) to (f) as defined above under emulsion polymerization conditions to produce an elastomeric seed polymer containing latex, allyl methacrylate being necessarily present, (II) adding additional monomers selected from (a) to (f) as defined above to the elastomeric seed polymer containing latex under emulsion polymerization conditions, (III) recovering the rubbery polymer from the emulsion containing the rubbery polymer.

DETAILED DESCRIPTION

For the purpose of the invention, the term "elastomeric" is intended to characterize a crosslinked polymer having rubbery properties at room temperature and over, and a glass transition temperature below zero, according to the norm DIN53520. For example, an elastomeric seed polymer containing latex can be obtained if at least 50 weight percent of butyl acrylate is used in step (I).

Advantageously, step (I) comprises polymerizing the monomers (a), (b), (c), (e) and (f), allyl methacrylate being necessarily present, and step (II) comprises adding additional monomer (c), the monomer (d) and additional monomer (f).

Technically, the rubbery polymer of this invention contains repeat units (chain linkages) which are derived from:
(a) butyl acrylate or a mixture of butyl acrylate and 2-ethylhexyl acrylate,
(b) at least one member selected from the group consisting of methyl methacrylate, ethyl methacrylate, methyl acrylate, and ethyl acrylate,
(c) acrylonitrile,
(d) styrene,
(e) a half ester maleate soap, and
(f) a crosslinking agent selected from allyl methacrylate and mixtures of allyl methacrylate with glycidyl methacrylate, trimethylolpropanetrimethyl acrylate, dicyclopentenyloxyethyl methacrylate, divinylbenzene.

These repeat units differ from the monomers that they are derived from in that they contain one less carbon-carbon double bond than is present in the respective monomer. In other words a carbon-to-carbon double bond is consumed during the polymerization of the monomer into a repeat unit in the rubbery polymer. Thus in saying that the rubbery polymer is comprised of various monomers in actuality means that it contains repeat units which are derived from those monomers.

Advantageously, the rubbery polymer according to the invention comprises:
(a) from 40 to 80 weight percent butyl acrylate or from 40 to 80 weight percent of a mixture of butyl acrylate and 2-ethylhexyl acrylate containing up to about 40 weight percent 2-ethylhexyl acrylate,
(b) from 1 to 35 weight percent of a member selected from the group consisting of methyl methacrylate, ethyl methacrylate, methyl acrylate, and ethyl acrylate,
(c) from 4 to 30 weight percent acrylonitrile,
(d) from 3 to 25 weight percent styrene, and
(e) from 0.5 to 8 weight percent half ester maleate soap, and
(f) from 0.2 to 8 weight percent crosslinking agent selected from allyl methacrylate and mixtures of allyl methacrylate with glycidyl methacrylate, trimethylolpropanetrimethyl acrylate, dicyclopentenyloxyethyl methacrylate, and divinylbenzene.

More advantageously the rubbery polymer according to the invention comprises:
(a) from 50 to 80 weight percent butyl acrylate, or from 50 to 80 weight percent of a mixture of butyl acrylate and 2-ethylhexyl acrylate containing up to about 40 weight percent of 2-ethylhexyl acrylate,
(b) from 1 to 25 weight percent of a member selected from the group consisting of methyl methacrylate, ethyl methacrylate, methyl acrylate and ethyl acrylate,
(c) from 6 to 30 weight percent acrylonitrile,
(d) from 5 to 18 weight percent styrene, and
(e) from 1 to 5 weight percent half ester maleate soap, and
(f) from 0.25 to 4 weight percent of crosslinking agent selected from allyl methacrylate and mixtures of allyl methacrylate with glycidyl methacrylate, trimethylolpropanetrimethyl acrylate, dicyclopentenyloxyethyl methacrylate, divinylbenzene.

Still more advantageously, the rubbery polymer according to the invention comprises:
(a) from 55 weight percent to 75 weight percent butyl acrylate, or a mixture of butyl acrylate and 2-ethylhexyl acrylate containing up to about 40 weight percent of 2-ethylhexyl acrylate,
(b) from 1 weight percent to 20 weight percent of at least one member selected from the group consisting of methyl methacrylate, ethyl methacrylate, methyl acrylate, and ethyl acrylate,
(c) from 10 weight percent to 25 weight percent acrylonitrile,
(d) from 8 weight percent to 14 weight percent styrene,
(e) from 2 weight percent to 4 weight percent of a half ester maleate soap, and
(f) from 0.25 weight percent to 3 weight percent of a crosslinking agent selected from allyl methacrylate, and mixtures of allyl methacrylate with glycidyl methacrylate, trimethylolpropanetrimethyl acrylate, dicyclopentenyloxyethyl methacrylate, divinylbenzene.

According to the invention, the preferred crosslinking agent is allyl methacrylate and the rubbery polymer preferably comprises 0.25 to 3 weight percent, preferably around 0.5 weight percent of allyl methacrylate.

The rubbery polymer according to the invention may be prepared by any methods known from the one skilled in the art. For example they may be synthesized in an aqueous reaction mixture by utilizing a free radical polymerization technique as described in detail in U.S. Pat. Nos. 5,380,785 and in 5,616,651.

The rubbery polymers of the present invention are synthesized in an aqueous reaction mixture by utilizing a free radical polymerization technique. The reaction mixture utilized in this polymerization technique is comprised of water, the appropriate monomers, a suitable free radical initiator, a crosslinking agent selected from allyl methacrylate, and mixtures of allyl methacrylate with glycidyl methacrylate, trimethylolpropanetrimethyl acrylate, dicyclopentenyloxyethyl methacrylate and divinylbenzene, a half ester maleate soap, and a metal salt of an alkyl sulfonate or a metal salt of an alkyl sulfate. The reaction mixture utilized in this polymerization technique will normally contain from 5 weight percent to 80 weight percent monomers, based upon the total weight of the reaction mixture. The reaction mixture will preferably contain from 15 weight percent to 70 weight percent monomers and will more preferably contain from 25 weight percent to 50 weight percent monomers.

The reaction mixtures utilized in carrying out such polymerizations will typically contain from 0.005 phm (parts per hundred parts of monomer by weight) to 1 phm of at least one member selected from the group consisting of metal salts of alkyl sulfates and metal salts of alkyl sulfonates. It is generally preferred for the reaction mixture to contain from 0.008 phm to 0.5 phm of the metal salt of the alkyl sulfonate or the metal salt of the alkyl sulfate. It is normally more preferred for the reaction mixture to contain from 0.05 phm to 0.3 phm of the metal salt of the alkyl sulfonate or the metal salt of the alkyl sulfate.

The free radical polymerization technique utilized in this synthesis is normally initiated by including a free radical initiator in the reaction mixture. Virtually, any type of compound capable of generating free radicals can be utilized as the free radical initiator. The free radical generator is normally employed at a concentration within the range of 0.01 phm to 1 phm. The free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like, the various alkyl perketals, such as 2,2-bis-(t-butyl-peroxy)butane, and the like. Water soluble peroxygen free radical initiators are especially useful in such aqueous polymerizations.

The emulsion polymerizations of this invention are typically carried out at the temperature ranging between 20° C. (60° F.) and 88° C. (190° F.). At temperatures above 88° C., alkyl acrylate monomers, such as butyl acrylate, have a tendency to boil. Thus, a pressurized jacket would be required for heating such alkyl acrylate monomers to temperatures in excess of about 88° C. On the other hand, at polymerization temperatures of less than 55° C. a redox initiator system is required to insure satisfactory polymerization rates.

The sulfonate surfactants that are useful in this invention are commercially available from a wide variety of sources. For instance, Du Pont sells sodium alkylarylsulfonate under the tradename Alkanol™, STEPAN sells sodium dodecylbenzene sulfonates under the tradename Polystep, and Nease Performance Chemicals sells sodium cumene sulfonate under the tradename Naxonate Hydrotrope™. Some representative examples of sulfonate surfactants which can be used include sodium toluene-xylene sulfonate, sodium toluene sulfonate, sodium cumene sulfonates, sodium decyldiphenylether sulfonate, sodium dodecylbenzenesulfonate, sodium dodecyldiphenylether sulfonate, sodium 1-octane sulfonate, sodium tetradecane sulfonate, sodium pentadecane sulfonate, sodium heptadecane sulfonate, and potassium toluene sulfonate.

Metal salts of alkylbenzene sulfonates are a highly preferred class of sulfonate surfactant. The metal will generally be sodium or potassium with sodium being preferred. Sodium salts of alkylbenzene sulfonates have the structural formula:

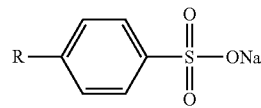

wherein R represents an alkyl group containing from 1 to 20 carbon atoms. It is preferred for the alkyl group to contain from 8 to 14 carbon atoms.

The free radical emulsion polymerization, used in synthesizing the rubbery polymers of this invention, is typically conducted at a temperature which is within the range of 10 to 95° C. In most cases, the polymerization temperature utilized will vary between about 20 and 80° C.

According to techniques well-known in the art, modifiers (or chain transfer agents) can be added to the reaction mixture in order to terminate the polymers and control the chain length during the emulsion polymerization. The modifier can be advantageously t-dodecylmercaptan, but other modifiers can be selected by the skilled person.

The polymerization is advantageously carried out as a two step batch process. In the first step, an elastomeric seed polymer containing latex is synthesized, allyl methacrylate being necessarily present.

This can be done advantageously by polymerizing (a) butyl acrylate, or a mixture of butyl acrylate and 2-ethylhexyl acrylate, (b) at least one member selected from the group consisting of methyl methacrylate, ethyl methacrylate, methyl acrylate, and ethyl acrylate, (c) acrylonitrile, (e) a half ester maleate soap, and (f) allyl methacrylate, glycidyl methacrylate, trimethylolpropanetrimethyl acrylate, dicyclopentenyloxyethyl methacrylate, divinylbenzene, and mixtures thereof, allyl methacrylate being necessarily present.

After the seed polymer latex has been prepared, additional monomer is added to the seed polymer containing latex.

This can be done advantageously by adding styrene monomer, additional acrylonitrile monomer, and additional crosslinking agent selected from allyl methacrylate, glycidyl methacrylate, trimethylolpropanetrimethyl acrylate, dicyclopentenyloxyethyl methacrylate, divinylbenzene and mixtures thereof, to the elastomeric seed polymer containing latex.

In most cases, the polymerization will be continued until a high monomer conversion has been attained. At this point, the rubbery polymer advantageously made by the two step batch polymerization process is recovered from the emulsion (latex). This can be accomplished by utilizing standard coagulation techniques. For instance, coagulation can be accomplished by the addition of salts, acids, or both to the latex, according to techniques known in the art.

The half ester maleate soap utilized in the polymerization is prepared by reacting maleic anhydride with a fatty alcohol containing from 10 to 24 carbon atoms. It is typically preferred to utilize a fatty alcohol which contains from 12 to 16 carbon atoms. One mole of the maleic anhydride is reacted with one mole of the fatty alcohol in producing the half ester maleate soap. This reaction is typically conducted at a temperature which is within the range of 50° C. to 80° C. and can be depicted as follows:

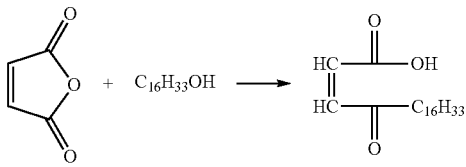

Sodium hydroxide or potassium hydroxide is then typically added to make the half ester maleate soap. This step can be depicted as follows:

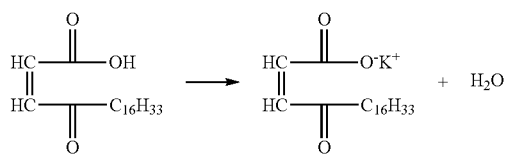

After the rubbery polymer is recovered by coagulation, it is dried. It is sometimes advantageous to convert the rubbery polymer into a powder to facilitate its usage. In this case, it will be beneficial to add a partitioning agent to the rubbery polymer. Some representative examples of partitioning agents which can be employed include calcium carbonate, emulsion polyvinyl chloride, and silica. Calcium carbonate is a highly desirable partitioning agent which can be utilized in such applications.

The present invention thus also relates to a method for preparing a rubbery polymer according to the invention comprising the steps of:
(I) polymerizing monomers selected from (a) to (f) as defined above under emulsion polymerization conditions to produce an elastomeric seed polymer containing latex, allyl methacrylate being necessarily present,
(II) adding additional monomers selected from (a) to (f) to the elastomeric seed polymer containing latex under emulsion polymerization conditions,
(III) recovering the rubbery polymer from the emulsion containing the rubbery polymer.

In a preferred embodiment of the method according to the invention, step (I) comprises polymerizing the monomers (a), (b), (c), (e) and (f), allyl methacrylate being necessarily present, and step (II) comprises adding additional monomer (c), the monomer (d) and additional monomer (f).

The instant invention also relates to a polymeric composition which is a blend comprising at least one thermoplastic resin and a rubbery polymer as previously disclosed.

A wide variety of thermoplastic resins can be utilized in the blends of the instant invention. For instance, the thermoplastic resin can be a halogenated thermoplastic resin or it can be a halogen-free thermoplastic. Some representative examples of thermoplastic resins which can be utilized include polyvinylchloride (PVC), chlorinated polyethylene, vinylacetate graft polyvinylchloride, butylacetate graft polyvinylchloride, ethylenevinylacetate, ethylenevinylacetate/carbon monoxide copolymer, ethylene/butyl acrylate/carbon monoxide terpolymer, polyethylene, polypropylene, ABS resins, acrylonitrile/styrene/acrylonitrile block copolymers (ASA resins), styrene/butadiene/styrene block copolymers (SBS resins), styrene/ethylene-about 5 weight percent to 40 weight percent of the rubbery polymer and from about 60 weight percent to about 95 weight of the thermoplastic resin.

The polymeric composition can be prepared by blending the rubbery polymer into at least one thermoplastic resin utilizing standard mixing techniques, as described for example in U.S. Pat. No. 5,362,787.

The polymeric composition according to the invention can also optionally contain a plasticizer.

A wide variety of plasticizers which are compatible with the thermoplastic resins can be employed. Some representative examples of plasticizers which are highly suitable for this application include abietic derivatives, such as hydroabietyl alcohol, methyl abietate and hydrogenated methyl abietate; acetic acid derivatives, such as cumylphenyl acetate; adipic acid derivatives, such as benzyloctyl adipate, dibutyl adipate, diisobutyl adipate, di-(2-ethylhexyl) adipate, diisononyl adipate, diisooctyl adipate, dinonyl adipate, C7-9 linear adipate, dicapryl adipate, octyl decyl adipate (n-octyl, n-decyl adipate), straight chain alcohol adipate, didecyl adipate (diisodecyl adipate), dibutoxyethyl adipate, high molecular weight adipate, polypropylene adipate, modified polypropylene adipate; azelaic acid derivatives, such as dicyclohexyl azelate, di-(2-ethylhexyl) azelate, di-n-hexyl azelate, low temperature plasticizer, diisooctyl azelate; benzoic acid derivatives such as diethylene glycol dibenzoate, dipropylene glycol dibenzoate, diethylene glycol benzoate and dipropylene glycol benzoate blend, proprietary low stain, neopentyl glycol dibenzoate, glyceryl tribenzoate, timethylolethane tribenzoate, pentaerylthritol tribenzoate, cumylphenyl benzoate; polyphenyl derivatives such as hydrogenated terphenyl; citric acid derivatives, such as triethyl citrate, tri-n-butyl citrate, acetyl triethyl citrate, acetyl tri-n-butyl citrate, acetal tributyl citrate; epoxy derivatives such as butyl epoxy stearate, epoxy-type plasticizer, epoxy-type plasticizer tallate, alkyl epoxy stearate, epoxidized butyl ester, epoxidized octyl tallage, epoxidized soybean oil, epoxidized triglyceride, epoxidized soya bean oil, epoxidized sunflower oil, epoxidized-type plasticizer, epoxidized linseed oil, epoxidized tallate ester, 2-ethylhexylepoxy tallate, octyl epoxy stearate; proprietary esters such as proprietary ester and mixed ester; ether derivatives, such as cumylphenyl benzyl ether; formal derivatives such as butyl carbitol formal; fumaric acid derivatives, such as dibutyl fumarate, diisooctyl fumarate, dioctyl fumarate; glutaric acid derivatives such as mixed dialkyl glutarates and dicumylphenyl glutarate; glycol derivatives such as diethylene glycol dipelargonate, triethylene glycol dipelargonate, triethylene glycol di-(2-ethylbutyrate), triethylene glycol di-caprylatecaprate, triethylene glycol di-(2-ethylhexoate), triethylene glycol dicaprylate, tetraethylene glycol dicaprylate, polyethylene glycol di-(2-ethylhexoate), butyl phthalyl butyl glycolate, triglycolester of vegetable oil fatty acid, triethylene glycol ester of fatty acid; linear dibasic acid derivatives such as mixed dibasic ester; petroleum derivatives such as aromatic hydrocarbons; isobutyric acid derivatives such as 2,2,4-trimethyl-1,3-pentanediol diisobutyrate; isophthalic acid derivatives such as di(2-ethylhexyl) isophthalate, diisooctyl isophthalate, dioctylisophthalate; lauric acid derivatives such as butyllaurate, 1,2-propylene glycol monolaurate, ethylene glycol monoethyl ether laurate, ethylene glycol monobutyl ether laurate, glycerol monolaurate, polyethylene glycol-400-dilaurate; mellitates such as n-octyl, n-decyl trimellitate, tri-n-octyl-n-decyl trimellitate, triisononyl trimellitate, triisooctyl trimellitate, tricapryl trimellitate, diisooctyl monoisodecyl trimellitate, triisodecyl trimellitate, tri(C7-9 alkyl) trimellitate, tri-2-ethylhexyl trimellitate; nitrile derivatives such as fatty acid nitrile; oleic acid derivatives such as butyl oleate, 1,2-propylene glycol mono oleate, ethylene glycol monobutyl ether oleate, tetrahydrofurfuryl oleate, glyceryl monoleate; paraffin derivatives such as chlorinated paraffins, diethylene glycol dipelargonate, triethylene glycol dipelargonate, 2-butoxyethyl dipelargonate; phenoxy plasticizers such as acetyl paracumyl phenol; phosphoric acid derivatives such as tri-(2-ethylhexyl) phosphate, tributoxyethyl phosphate, triphenyl phosphate, cresyl diphenyl phosphate, tricresyl phosphate, triisopropylphenyl phosphate, alkyl aryl phosphates, diphenyl-xylenyl phosphate, phenyl isopropylphenyl phosphate; phthalic acid derivatives such as alkyl benzene phthalates, dimethyl phthalate, dibutyl phthalate, diisobutyl phthalate, dihexyl phthalate, butyl octyl phthalate, butyl isodecyl phthalate, butyl iso-hexyl phthalate, diisononyl phthalate, dioctyl phthalate, di-(2-ethyl hexyl) phthalate, n-octyl-n-decyl phthalate, hexyl octyl decyl phthalate, didecyl phthalate diisodecyl phthalate, diisodecyl phthalate, diundecyl phthalate, butyl-ethylhexyl phthalate, butylbenzyl phthalate, octylbenzyl phthalate, dicyclohexyl phthalate, diphenyl phthalate, alkylaryl phthalates and 2-ethylhexylisodecyl phthalate; ricinoleic acid derivatives such as methylacetyl ricinoleate, n-butyl acetyl ricinoleate, glyceryl triacetyl ricinoleate; sebacic acid derivatives such as dimethyl sebacate, dibutyl sebacate, and dibutoxyethyl sebacate; stearic acid derivatives such as glyceryl tri-acetoxy stearate, butyl acetoxy stearate, methylpentachlorostearate, and methoxyethyl acetoxy stearate; sucrose derivatives such as sucrose benzoate; sulfonic acid derivatives such as alkylsulfonic esters of phenol; tall oil derivatives such as methylester of tall oil and isooctyl ester of tall oil; and terephthalic acid derivatives such as dioctyl terephthalate.

Other ingredients, such as antioxidants and fillers can be added to the polymeric composition to attain the desirable properties and to reduce cost. Various colorants and/or pigments will typically also be added to the composition to attain the desirable color.

The invention also discloses a gasket with low compression set comprised of a blend comprising at least one thermoplastic resin and a rubbery polymer as previously disclosed.

The rubbery polymer according to the invention confers to the resin a low compression set: the blend satisfies the German RAL-GZ716/1 specification (Reichsausschuss für Lieferbedingungen—standard for exterior dynamic gaskets), in particular when the thermoplastic is PVC, with a compression set inferior to 50%. The blends made with the rubbery polymer of the invention offer excellent behaviour, dimensional stability, low compression set, light color, outstanding sealing characteristics and low temperature stability.

This invention is illustrated by the following examples, which are merely for the purpose of illustration, and are not to be regarded as limiting the scope of this invention or the manner in which it can be practiced. Unless specifically indicated otherwise, all parts and percentages are given by weight.

EXAMPLES

Comparative Example 1

Preparation of a Rubbery Polymer by Standard Technique

A free flow powder was prepared according to the procedure described in U.S. Pat. No. 5,380,785. The quantities of monomers and reactants were adjusted to a reactor having a capacity of 5 liters.

Example 2

Preparation of a Rubbery Polymer

In this experiment a rubbery polymer was made utilizing the techniques of this invention. The polymerization was conducted in a reactor having a capacity of 5 liters. The reactor was equipped with an axially flow turbine agitator which was operated at 350 rpm (revolutions per minutes).

The reactor was charged with 3040 g (grams) of water, 35.6 g of a half ester maleate soap (made with $C_{16}$ fatty alcohol), 15.2 g of a 45 percent aqueous potassium hydroxide solution, 8.4 g of a 25 percent aqueous sodium dodecylbenzene sulfonate solution, 2.6 g of tetrasodium pyrophosphate, 907 g of n-butylacrylate, 107 g of acrylonitrile, 53 g of methylmethacrylate, 6.4 g of allyl methacrylate, 1.02 g of t-dodecylmercaptan, 0.77 g of triethanol amine and 64 g of a 5 percent aqueous potassium persulfate solution. A temperature of about 40° C. was maintained during the first part of the polymerization. When a solids content of about 20 percent was reached the reaction temperature was increased up to 60° C. This first stage polymerization was considered as completed when a total solids content of about 26% was reached. The seed polymer latex thus obtained was used in the second step of the polymerization.

In the second step of the polymerization, 61 g of acrylonitrile, 142 g of styrene, 2.3 g of divinylbenzene and 0.38 g of t-dodecylmercaptan were charged into the reactor containing the seed polymer latex. The polymerization proceeded until a solids content of about 30 percent was reached. The latex produced had a white color, a pH of about 7, a surface tension of about 52 dyne per centimeter, a particle size of about 80 nanometers.

The latex made was coagulated and a dry rubber in crumb form was recovered. The crumbs were then mixed with calcium carbonate (as a partitioning agent) and ground to obtain a free flowing powder.

Example 3

Preparation of a Rubbery Polymer

In this experiment a rubbery polymer was synthesized utilizing a procedure similar to the procedure employed in the Example 3.

The reactor was charged with 3040 g (grams) of water, 35.6 g of a half ester maleate soap (made with $C_{16}$ fatty alcohol), 15.2 g of a 45 percent aqueous potassium hydroxide solution, 8.4 g of a 25 percent aqueous sodium dodecylbenzene sulfonate solution, 2.6 g of tetrasodium pyrophosphate, 907 g of n-butylacrylate, 107 g of acrylonitrile, 53 g of methylmethacrylate, 6.4 g of allyl methacrylate, 1.02 g of t-dodecylmercaptan, 0.77 g of triethanol amine and 64 g of a 5 percent aqueous potassium persulfate solution. A temperature of about 40° C. was maintained during the first part of the polymerization. When a solids content of about 20 percent was reached the reaction temperature was increased up to 60° C. This first stage polymerization was considered as completed when a total solids content of about 26% was reached. The seed polymer latex thus obtained was used in the second step of the polymerization.

In the second step of the polymerization, 61 g of acrylonitrile, 142 g of styrene, 15.2 g of allyl methacrylate and 0.38 g of t-dodecylmercaptan were charged into the reactor containing the seed polymer latex. The polymerization proceeded until a solids content of about 30 percent was reached. The latex produced had a white color, a pH of about 7, a surface tension of about 52 dyne per centimeter, a particle size of about 85 nanometers.

The obtained latex was coagulated and a dry rubber in crumb form was recovered. The crumbs were then mixed with calcium carbonate (as a partitioning agent) and ground to obtain a free flowing powder.

Example 4

Preparation of a Rubbery Polymer

In this experiment a rubbery polymer was synthesized utilizing a procedure similar to the procedure employed in the Example 3, except that, in the second step of the polymerization, 5 g of trimethylolpropane trimethacrylate was used as the additional crosslinking agent instead of divinylbezene.

Example 5

Preparation of a Blend

In this experiment a dry blend masterbatch containing 100 parts of polyvinylchloride having a K value of 71, 80 parts of diisodecyl phtalate and 3 parts of Ca/Zn stabilizer was made using an Henschel mixer. Then 80 parts of the free flow powder made by the procedure described in Example 2 (containing 100 parts of pure polymer and about 7-10 parts of calcium carbonate) was mixed into this polyvinylchloride dry blend. The compound referenced as B was gelified with a twin screw extruder injection molded to give test samples having the characteristics reported in table 1.

A second composition referenced as C was prepared utilizing the free flow powder made in Example 3 in place of the rubbery polymer made in Example 2.

A third composition referenced as D was also prepared utilizing the free flow powder made in Example 4 in place of the rubbery polymer made in Example 2.

For the purpose of comparison, a composition referenced as A was prepared utilizing the polymer of Comparative Example 1.

TABLE 1

| Example | Shore A Hardness | Tensile Strength (MPa) | Elongation at break (%) | Modulus 50% (MPa) | Modulus 100% (MPa) | Compression set at 70° C./ 22 hours (%) |
|---|---|---|---|---|---|---|
| A | 62 | 12.8 | 285 | 2.4 | 4.5 | 57 |
| B | 62 | 12.9 | 283 | 2.6 | 4.7 | 47 |
| C | 62 | 12.2 | 275 | 2.7 | 4.8 | 48 |
| D | 61 | 11.5 | 271 | 2.5 | 4.7 | 45 |

The compression set values obtained for the polymers B, C and D are significantly improved compared to the reference sample A, while keeping similar elongation at break values and no increase of the polymer blend hardness.

The invention claimed is:

1. A polymeric composition which is a blend comprising PVC and a rubbery polymer comprising:
    (a) from 40 to 80 weight percent butyl acrylate or from 40 to 80 weight percent of a mixture of butyl acrylate and 2-ethylhexyl acrylate containing up to about 40 weight percent 2-ethylhexyl acrylate,
    (b) from 1 to 35 weight percent of a member selected from the group consisting of methyl methacrylate, ethyl methacrylate, methyl acrylate, and ethyl acrylate,
    (c) from 4 to 30 weight percent acrylonitrile,
    (d) from 3 to 25 weight percent styrene, and
    (e) from 0.5 to 8 weight percent half ester maleate soap, and
    (f) from 0.25 to 4 weight percent of a crosslinking agent selected from the group consisting of allyl methacrylate, glycidyl methacrylate, trimethylolpropanetrimethyl acrylate, and divinylbenzene, wherein the rubbery polymer contains 0.25 to 3 weight percent of allyl methacrylate,
wherein said rubbery polymer is obtainable by process comprising the steps of:
    (I) polymerizing monomers (a), (b), (c), (e) and (f) as defined above under emulsion polymerization conditions to produce an elastomeric seed polymer containing latex, allyl methacrylate being necessarily present,
    (II) adding additional monomer (c), the monomer (d), and additional monomer (f) as defined above to the elastomeric seed polymer containing latex under emulsion polymerization conditions,
    (III) recovering the rubbery polymer from the emulsion containing the rubbery polymer,
wherein an amount of allyl methacrylate added in step (I) is about 0.5 weight percent, based on a total amount of polymerizing monomers (a), (b), (c), (e) and (f) added in step (I).

2. The polymeric composition according to claim 1, wherein the rubber polymer comprises:
    (a) from 50 to 80 weight percent butyl acrylate, or from 50 to 80 weight percent of a mixture of butyl acrylate and 2-ethylhexyl acrylate containing up to about 40 weight percent of 2-ethylhexyl acrylate,
    (b) from 1 to 25 weight percent of a member selected from the group consisting of methyl methacrylate, ethyl methacrylate, methyl acrylate and ethyl acrylate,
    (c) from 6 to 30 weight percent acrylonitrile,
    (d) from 5 to 18 weight percent styrene, and
    (e) from 1 to 5 weight percent half ester maleate soap, and
    (f) from 0.25 to 4 weight percent of a crosslinking agent selected from the group consisting of allyl methacrylate, glycidyl methacrylate trimethylolpropanetrimethyl acrylate, and divinylbenzene, wherein the rubbery polymer contains 0.25 to 3 weight percent of allyl methacrylate.

3. The polymeric composition according to claim 1, wherein the rubber polymer comprises:
    (a) from 55 weight percent to 75 weight percent butyl acrylate, or a mixture of butyl acrylate and 2-ethylhexyl acrylate containing up to about 40 weight percent of 2-ethylhexyl acrylate,
    (b) from 1 weight percent to 20 weight percent of at least one member selected from the group consisting of methyl methacrylate, ethyl methacrylate, methyl acrylate, and ethyl acrylate,
    (c) from 10 weight percent to 25 weight percent acrylonitrile,
    (d) from 8 weight percent to 14 weight percent styrene,
    (e) from 2 weight percent to 4 weight percent of a half ester maleate soap, and
    (f) from 0.25 weight percent to 3 weight percent of a crosslinking agent selected from the group consisting of allyl methacrylate, glycidyl methacrylate, trimethylolpropanetrimethyl acrylate, and and divinylbenzene, wherein the rubbery polymer contains 0.25 to 3 weight percent of allyl methacrylate.

4. The polymeric composition according to claim 1, wherein the crosslinking agent is allyl methacrylate.

5. The polymeric composition according to claim 1, further comprising an ingredient selected from plasticizers, antioxidants, fillers, colorants, pigments and mixtures thereof.

6. A gasket with a compression set measured at 70° C./22hours inferior to 50% comprised of a polymeric composition according to claim 1.

7. A polymeric composition, having a compression set at 70° C./22 hours ranging from 45 to 48, which is a blend comprising PVC and a rubbery polymer comprising:
   (a) from 40 to 80 weight percent butyl acrylate or from 40 to 80 weight percent of a mixture of butyl acrylate and 2-ethylhexyl acrylate containing up to about 40 weight percent 2-ethylhexyl acrylate,
   (b) from 1 to 35 weight percent of a member selected from the group consisting of methyl methacrylate, ethyl methacrylate, methyl acrylate, and ethyl acrylate,
   (c) from 4 to 30 weight percent acrylonitrile,
   (d) from 3 to 25 weight percent styrene, and
   (e) from 0.5 to 8 weight percent half ester maleate soap, and
   (f) from 0.25 to 4 weight percent of a crosslinking agent selected from the group consisting of allyl methacrylate, glycidyl methacrylate, trimethylolpropanetrimethyl acrylate, and divinylbenzene, wherein the rubbery polymer contains 0.25 to 3 weight percent of allyl methacrylate,
wherein said rubbery polymer is obtainable by process comprising the steps of:
   (I) polymerizing monomers (a), (b), (c), (e) and (f) as defined above under emulsion polymerization conditions to produce an elastomeric seed polymer containing latex, allyl methacrylate being necessarily present,
   (II) adding additional monomer (c), the monomer (d), and additional monomer (f) as defined above to the elastomeric seed polymer containing latex under emulsion polymerization conditions,
   (III) recovering the rubbery polymer from the emulsion containing the rubbery polymer.

8. The polymeric composition according to claim 7, wherein the rubber polymer comprises:
   (a) from 50 to 80 weight percent butyl acrylate, or from 50 to 80 weight percent of a mixture of butyl acrylate and 2-ethylhexyl acrylate containing up to about 40 weight percent of 2-ethylhexyl acrylate,
   (b) from 1 to 25 weight percent of a member selected from the group consisting of methyl methacrylate, ethyl methacrylate, methyl acrylate and ethyl acrylate,
   (c) from 6 to 30 weight percent acrylonitrile,
   (d) from 5 to 18 weight percent styrene, and
   (e) from 1 to 5 weight percent half ester maleate soap, and
   (f) from 0.25 to 4 weight percent of a crosslinking agent selected from the group consisting of allyl methacrylate, glycidyl methacrylate, trimethylolpropanetrimethyl acrylate, and divinylbenzene, wherein the rubbery polymer contains 0.25 to 3 weight percent of allyl methacrylate.

9. The polymeric composition according to claim 7, wherein the rubber polymer comprises:
   (a) from 55 weight percent to 75 weight percent butyl acrylate, or a mixture of butyl acrylate and 2-ethylhexyl acrylate containing up to about 40 weight percent of 2-ethylhexyl acrylate,
   (b) from 1 weight percent to 20 weight percent of at least one member selected from the group consisting of methyl methacrylate, ethyl methacrylate, methyl acrylate, and ethyl acrylate,
   (c) from 10 weight percent to 25 weight percent acrylonitrile,
   (d) from 8 weight percent to 14 weight percent styrene,
   (e) from 2 weight percent to 4 weight percent of a half ester maleate soap, and
   (f) from 0.25 weight percent to 3 weight percent of a crosslinking agent selected from the group consisting of allyl methacrylate, glycidyl methacrylate, trimethylolpropanetrimethyl acrylate, and d divinylbenzene, wherein the rubbery polymer contains 0.25 to 3 weight percent of allyl methacrylate.

10. The polymeric composition according to claim 7, wherein the crosslinking agent is allyl methacrylate.

11. The polymeric composition according to claim 7, further comprising an ingredient selected from plasticizers, antioxidants, fillers, colorants, pigments and mixtures thereof.

12. A gasket with a compression set measured at 70° C./22hours inferior to 50% comprised of a polymeric composition according to claim 7.

13. A polymeric composition which is a blend comprising PVC and a rubbery polymer comprising:
   (a) from 40 to 80 weight percent butyl acrylate or from 40 to 80 weight percent of a mixture of butyl acrylate and 2-ethylhexyl acrylate containing up to about 40 weight percent 2-ethylhexyl acrylate,
   (b) from 1 to 35 weight percent of a member selected from the group consisting of methyl methacrylate, ethyl methacrylate, methyl acrylate, and ethyl acrylate,
   (c) from 4 to 30 weight percent acrylonitrile,
   (d) from 3 to 25 weight percent styrene, and
   (e) from 0.5 to 8 weight percent half ester maleate soap, and
   (f) from 0.66 to 3.55 weight percent of a crosslinking agent selected from the group consisting of allyl methacrylate, glycidyl methacrylate, trimethylolpropanetrimethyl acrylate, and divinylbenzene, wherein the rubbery polymer contains 0.25 to 3 weight percent of allyl methacrylate,
wherein said rubbery polymer is obtainable by a process comprising the steps of:
   (I) polymerizing monomers (a), (b), (c), (e) and (f) as defined above under emulsion polymerization conditions to produce an elastomeric seed polymer containing latex, allyl methacrylate being necessarily present,
   (II) adding additional monomer (c), the monomer (d) and additional monomer (f) as defined above to the elastomeric seed polymer containing latex under emulsion polymerization conditions,
   (III) recovering the rubbery polymer from the emulsion containing the rubbery polymer.

14. The polymeric composition according to claim 13, wherein the rubber polymer comprises:
   (a) from 50 to 80 weight percent butyl acrylate, or from 50 to 80 weight percent of a mixture of butyl acrylate and 2-ethylhexyl acrylate containing up to about 40 weight percent of 2-ethylhexyl acrylate,
   (b) from 1 to 25 weight percent of a member selected from the group consisting of methyl methacrylate, ethyl methacrylate, methyl acrylate and ethyl acrylate,
   (c) from 6 to 30 weight percent acrylonitrile,
   (d) from 5 to 18 weight percent styrene, and
   (e) from 1 to 5 weight percent half ester maleate soap, and (f) from 0.66 to 3.55 weight percent of a crosslinking agent selected from the group consisting of allyl methacrylate, glycidyl methacrylate, trimethylolpropanetrimethyl acrylate, and divinylbenzene, wherein the rubbery polymer contains 0.25 to 3 weight percent of allyl methacrylate.

15. The polymeric composition according to claim 13, wherein the rubber polymer comprises:
   (a) from 55 weight percent to 75 weight percent butyl acrylate, or a mixture of butyl acrylate and 2-ethylhexyl acrylate containing up to about 40 weight percent of 2-ethylhexyl acrylate,
   (b) from 1 weight percent to 20 weight percent of at least one member selected from the group consisting of methyl methacrylate, ethyl methacrylate, methyl acrylate, and ethyl acrylate,
   (c) from 10 weight percent to 25 weight percent acrylonitrile,
   (d) from 8 weight percent to 14 weight percent styrene,
   (e) from 2 weight percent to 4 weight percent of a half ester maleate soap, and
   (f) from 0.66 weight percent to 3 weight percent of a crosslinking agent selected from the group consisting of allyl methacrylate, glycidyl methacrylate, trimethylolpropanetrimethyl acrylate, and d divinylbenzene, wherein the rubbery polymer contains 0.25 to 3 weight percent of allyl methacrylate.

16. The polymeric composition according to claim 13, wherein the crosslinking agent is allyl methacrylate.

17. The polymeric composition according to claim 13, further comprising an ingredient selected from plasticizers, antioxidants, fillers, colorants, pigments and mixtures thereof.

18. A gasket with a compression set measured at 70° C./22hours inferior to 50% comprised of a polymeric composition according to claim 13.

* * * * *